(12) United States Patent
Castro et al.

(10) Patent No.: US 10,020,886 B2
(45) Date of Patent: Jul. 10, 2018

(54) METHODS AND SYSTEMS FOR FIBER OPTIC COMMUNICATION

(71) Applicant: Panduit Corp., Tinley Park, IL (US)

(72) Inventors: Jose M. Castro, Lombard, IL (US); Richard J. Pimpinella, Frankfort, IL (US); Brett Lane, Hinsdale, IL (US); Bulent Kose, Burr Ridge, IL (US); Yu Huang, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/294,965

(22) Filed: Oct. 17, 2016

(65) Prior Publication Data

US 2018/0109318 A1    Apr. 19, 2018

(51) Int. Cl.
*H04B 10/69* (2013.01)
*H04B 10/2507* (2013.01)
*H04B 10/079* (2013.01)

(52) U.S. Cl.
CPC ... *H04B 10/2507* (2013.01); *H04B 10/07953* (2013.01); *H04J 2203/0076* (2013.01); *H04Q 2213/03* (2013.01)

(58) Field of Classification Search
CPC ... H04B 10/40; H04B 10/505; H04B 10/6971
See application file for complete search history.

(56) References Cited

U.S. PATENT DOCUMENTS

| | | | |
|---|---|---|---|
| 8,270,843 B2 * | 9/2012 | Nakamoto | H04B 10/2507 398/159 |
| 8,406,356 B2 | 3/2013 | Hollis | |
| 8,605,847 B2 | 12/2013 | Mobin et al. | |
| 8,923,382 B2 | 12/2014 | Ito et al. | |
| 8,929,497 B2 | 1/2015 | Chmelar et al. | |
| 8,989,300 B1 | 3/2015 | Asmanis et al. | |
| 9,014,318 B2 | 4/2015 | Hollis | |
| 9,184,841 B2 | 11/2015 | Robinson et al. | |
| 9,379,878 B1 | 6/2016 | Lugthart et al. | |
| 9,692,521 B1 * | 6/2017 | Zhou | H04B 10/58 |
| 2010/0159855 A1 * | 6/2010 | Hardacker | H04B 1/0475 455/114.3 |
| 2016/0173304 A1 * | 6/2016 | Le Taillandier De Gabory | H04B 10/50575 398/76 |

FOREIGN PATENT DOCUMENTS

| | | |
|---|---|---|
| EP | 2157716 A1 | 2/2010 |
| EP | 2639976 A1 | 9/2013 |
| WO | 2015062544 A1 | 5/2015 |

* cited by examiner

*Primary Examiner* — Shi K Li
(74) *Attorney, Agent, or Firm* — Christopher S. Clancy; James H. Williams; Christopher K. Marlow

(57) ABSTRACT

The present invention relates in general to communication systems, and more specifically towards methods, systems, and devices that help improve transmission rates and spectral efficiency of intensity modulated (IM) or power modulated channels utilizing multi-level pulse amplitude modulation PAM-M. In an embodiment, the present invention used an iterative algorithm to open the eyes of an eye diagram in a relatively short number of steps. The algorithm, which may not require previous characterization of the channel, utilizes pseudo-random sequences, such as PSBS15 or PRQS10, and adaptive non-linear equalizers to optimize the pre-distortion taps.

17 Claims, 7 Drawing Sheets

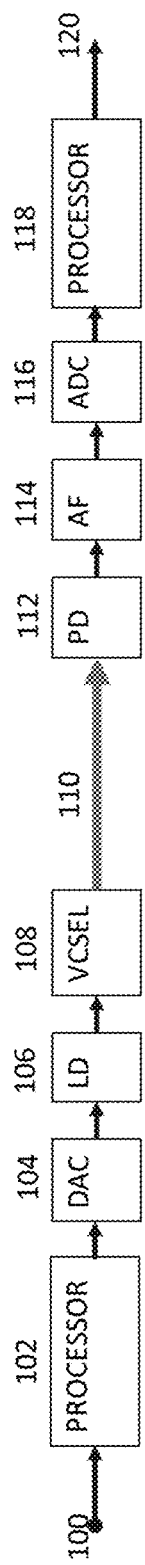
Fig. 1
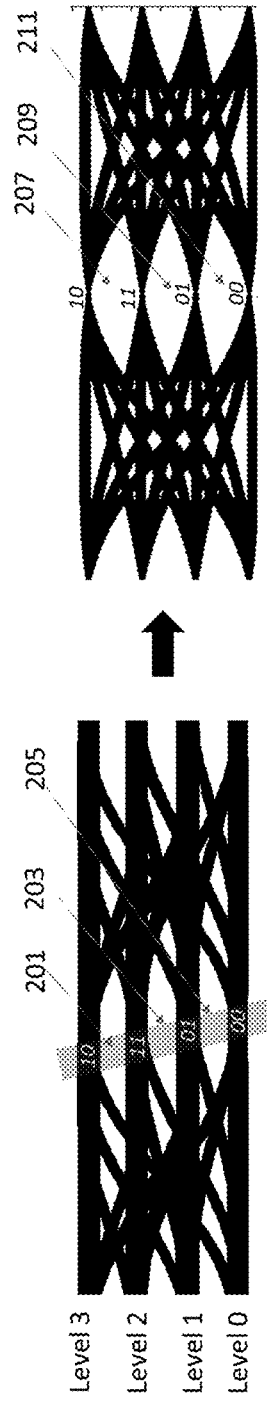
Fig. 2A
Fig. 2B

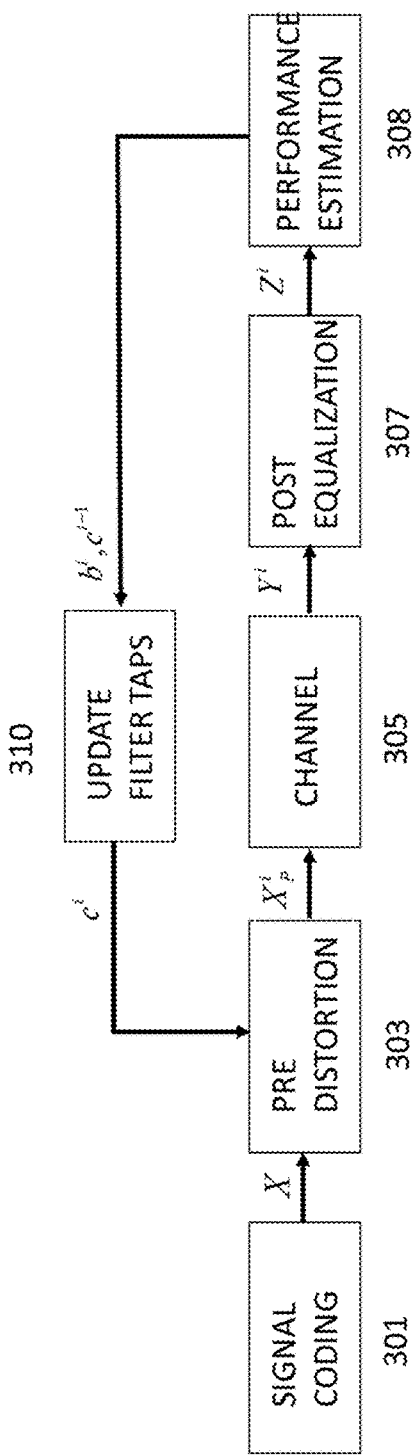
Fig. 3
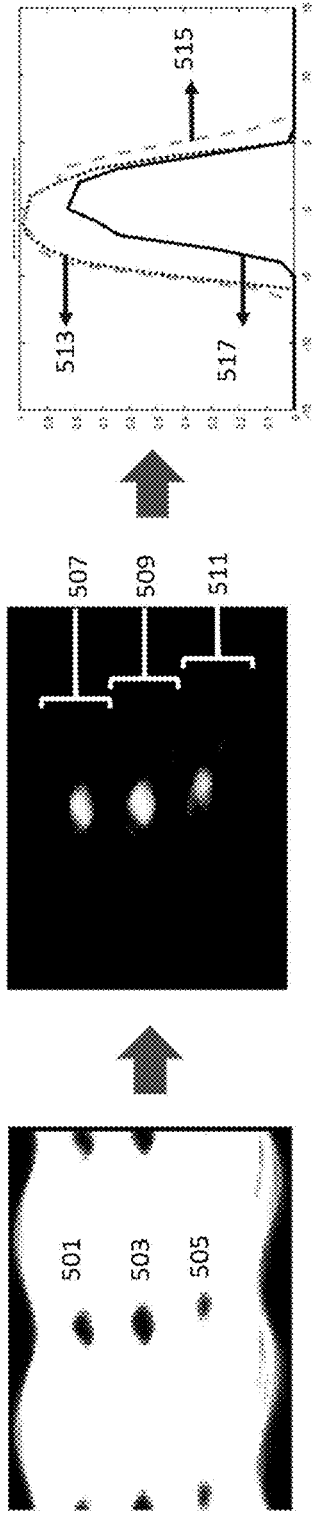
Fig. 4A
Fig. 4B
Fig. 4C

METHODS AND SYSTEMS FOR FIBER OPTIC COMMUNICATION

FIELD OF INVENTION

The present invention relates in general to communication systems, and more specifically towards methods, systems, and devices that help improve transmission rates and spectral efficiency of intensity modulated (IM) or power modulated channels utilizing multi-level pulse amplitude modulation PAM-M.

BACKGROUND

The exponential growth of internet traffic is driving the increase of transmission data rates in data centers. It is predicted that transceivers operating at speeds equal or higher than 50 Gbps per lane will be utilized in high volume by 2020. The predominant optical media types utilized in data centers are multimode and single-mode optical fibers. The preferred modulation format for transceivers required to achieve data rates higher than 25 Gbps in both fiber types is pulse amplitude modulation (PAM) and in particular PAM-4. For directly modulated vertical-cavity surface-emitting laser (VCSEL) based transceivers, the implementation of PAM-4 at data rates over 50 Gbps is challenging due to the slow and non-linear response of the laser. This slow and non-linear response results in signal degradation exhibitable by uneven and/or skewed eyes in an eye diagram.

Thus, there exists a need for further development of methods, systems, and devices which optimize optical signal transmission at high data rates (e.g., at or over 50 Gbps) reducing optical penalties caused by channel impairments such as laser jitter, laser eye tilt, optical dispersion, and distortion among others.

As such, there is a need for further development of devices, systems, and methods which attempt to reduce optical penalties caused by channel impairments such as laser jitter, laser eye tilt, optical dispersion, and distortion among others.

SUMMARY

Accordingly, disclosed herein are embodiments of devices, systems, and methods which attempt to reduce optical penalties caused by channel impairments such as laser jitter, laser eye tilt, optical dispersion, and distortion among others.

In an embodiment, the present invention provides a method and apparatus for optimizing/tuning data transmission over optical channels where only the power or intensity of the signals can be modulated.

In another embodiment, the present invention is an iterative method of optimizing the pre-distortion and correction for eye diagram skew.

In yet another embodiment, the present invention is directed towards using an iterative algorithm to open the eyes of an eye diagram in a relatively short number of steps. The algorithm, which may not require previous characterization of the channel, utilizes pseudo-random sequences, such as PSBS15 or PRQS10, and adaptive non-linear equalizers to optimize the pre-distortion taps.

In still yet another embodiment, the present invention is an optical communication system for transmitting a communication signal. The optical communication system comprises a first transceiver; a second transceiver; an optical medium for transmitting the communication signal between the first transceiver and the second transceiver; a pre-distortion circuit for conditioning the communication signal prior to a transmission of the communication signal by the first transceiver, the pre-distortion circuit providing linear correction of the communication signal; a post-equalization circuit for conditioning the communication signal after a receipt of the communication signal by the second transceiver, the post-equalization circuit providing linear correction of the communication signal, at least one of the pre-distortion circuit and the post-equalization circuit further providing non-linear correction of the communication signal; and a feedback circuit providing at least some information from the post-equalization circuit to the pre-distortion circuit.

In still yet another embodiment, the present invention is a method of tuning a fiber optic communication system. The method includes the steps of:
 (a) generating a source signal X;
 (b) pre-distorting the source signal X by applying at least one pre-distortion equalizer to the source signal X to generate a pre-distorted signal $X^i_P$;
 (c) transmitting the pre-distorted signal $X^i_P$ over an optical channel to generate a transmitted signal $Y^i$;
 (d) post-equalizing the transmitted signal $Y^i$ by applying at least one post-equalization equalizer to the transmitted signal $Y^i$ to generate a post-equalized signal $Z^i$;
 (e) evaluating the post-equalized signal $Z^i$ to determine a performance of the fiber optic communication system; and
 (f) when the performance of the fiber optic communication system fails to meet a predefined threshold, updating the at least one pre-distortion equalizer and repeating steps (b)-(f), wherein i represents an index tracking each cycle of performing the steps (b)-(f).

In still yet another embodiment, the present invention is an optical transceiver configured to at least one of transmit and receive a communication signal. The optical transceiver comprises: a pre-distortion circuit for conditioning the communication signal prior to a transmission of the communication signal by the optical transceiver, the pre-distortion circuit providing linear correction of the communication signal; a post-equalization circuit for conditioning the communication signal after a receipt of the communication signal by the optical transceiver, the post-equalization circuit providing linear correction of the communication signal, at least one of the pre-distortion circuit and the post-equalization circuit further providing non-linear correction of the communication signal; and a feedback circuit for providing at least some information from the post-equalization circuit to a secondary pre-distortion circuit of a secondary optical transceiver.

In still yet another embodiment, the present invention is an optical communication system which comprises:
 (a) means for generating a source signal X;
 (b) means for pre-distorting said source signal X by applying at least one pre-distortion equalizer to said source signal X to generate a pre-distorted signal $X^i_P$;
 (c) means for transmitting said pre-distorted signal $X^i_P$ over an optical channel to generate a transmitted signal $Y^i$;
 (d) means for post-equalizing said transmitted signal $Y^i$ by applying at least one post-equalization equalizer to said transmitted signal $Y^i$ to generate a post-equalized signal $Z^i$;
 (e) means for evaluating said post-equalized signal $Z^i$ to determine a performance of said fiber optic communication system; and (f) means for updating said at least one pre-distortion equalizer and reinvoking means (b)-(f) when said performance of said fiber optic communication system fails to meet a predefined threshold, wherein i represents an index tracking each cycle of invoking means (b)-(f).

In still yet another embodiment, the present invention is a transceiver apparatus that includes: at least one processor capable of computing and applying linear and non-linear pre-distortion and post-equalization, circuits to perform ADC and DAC functionalities, clock recovery, laser driver, analog filters and amplifier, transmitter and receiver optical subassembly including laser and photodetectors with bandwidths equal or higher than 16 GHz. In a variation of this embodiment, the processor assigned to code and decode transmitter and receiver signals can synchronize, mathematically transform, and compare transmitted and received signals in order to update equalizer tap coefficients. In yet another variation, the processor is connected to an internal temperature sensor and has means to estimate the bias current or voltage applied to the laser. In still another variation, the processor(s) can connect to an external controller that regulate operational conditions such as temperature, in order to estimate the optimum equalization schemes for a given range of temperatures. In still yet another variation, the processor(s) can store information regarding optimum linear and non-linear equalization configuration for a given set of operational conditions (e.g., temperature or bias current). In still yet another variation, the processor(s) are able to retrieve stored information regarding optimum linear and non-linear equalization configuration for a given set of operational conditions, and modify equalization schemes gradually while minimizing BER. In still yet another variation, the processor at the transmitter uses sinc, raised cosine, Gaussian, or erf pulses with amplitude levels that do not map with the original PAM signal levels, producing a distorted signal with a closed eye diagram before the laser or before the post-equalization performed at the receiver. In still yet another variation, the processor at the transmitter uses polynomial functions, where the argument of those functions is the level of the original signal, in order to vary the timing of sinc, raised cosine, Gaussian, or erf pulses producing a data dependent jitter that compensate for the jitter produced by the time variant response of the laser. In still yet another variation, the processor at the transmitter uses signal dependent equalizer, where the taps depend on original signal levels in order to pre-distort the signal before is sent to the laser. In still yet another variation, the processor at the receiver uses a signal dependent equalizer, where the taps depend on signal recovered after ADC, in order to post-distort the signal before decoding.

Advantageous embodiments of the invention are based upon the inventors' recognition that current methods to characterize the laser response, i.e. S-parameters, are inaccurate when correcting the channel due to the non-linear time variant response of the laser. The inventors disclose an iterative approach to open the eye of an eye diagram and/or to minimize/reduce transmission bit error ratio (BER) using a combination of linear and non-linear equalization.

These and other features, aspects, and advantages of the present invention will become better understood with reference to the following drawings, description, and any claims that may follow.

BRIEF DESCRIPTION OF THE DRAWINGS

FIG. 1 illustrates a block diagram of transmission channel, according to an embodiment of the present invention.

FIG. 2A illustrates an exemplary eye diagram which exhibits skew/tilt.

FIG. 2B illustrates an exemplary eye diagram which has been corrected for skew/tilt.

FIG. 3 illustrates a flow diagram of a method of optimizing an optical transmission system, according to an embodiment of the present invention.

FIGS. 4A and 4B illustrate exemplary eye diagrams used in the calculation of a non-linear equalizer, according to an embodiment of the present invention.

FIG. 4C illustrates the profiles of the eyes shown in FIGS. 4A and 4B.

DETAILED DESCRIPTION

Figures 5A, 5B, 5C, 5D:
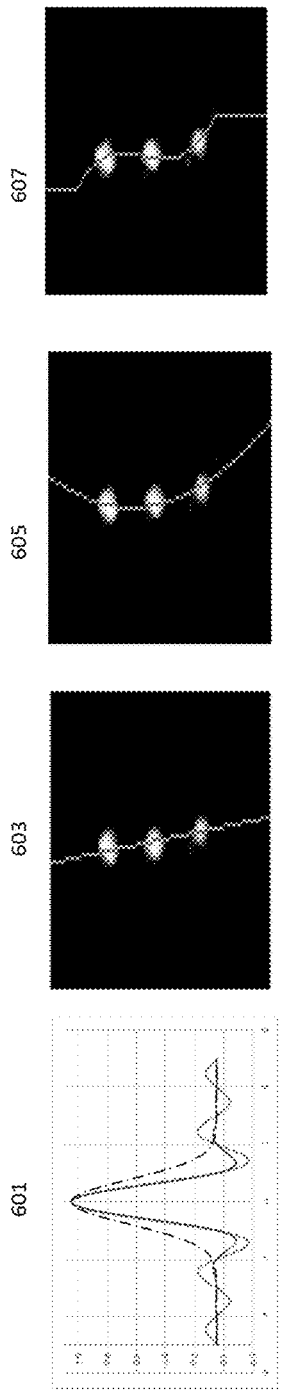
FIG. 5A illustrates exemplary plots representing the shape of signal pulses shown in FIG. 4C.
FIGS. 5B-5D illustrate exemplary procedures to obtain the eye diagram skew/tilt correction.

The following description is provided with reference to a VCSEL as an optical source and PAM-4 as the modulation format. However, it should be apparent that these references are exemplary, and the inventions described herein may be applicable to other modulation formats and may be used with other (laser and non-laser) optical sources.

Referring now to FIG. 1, said figure illustrates a block diagram of the primary components of a fiber transmission channel in accordance with an embodiment of the present invention. At input 100 data is transmitted in a binary or multilevel electrical signal format to the processor 102. The processor 102 uses the input sequence bits to form the required PAM signal. For example, if the input is a binary signal and the required transmission signaling format is PAM-4, the processor will assign two bits for each PAM-4 level. Processor 102 can use Gray coding to reduce errors in the detection of the signal and can oversample the signal using interpolation to estimate the signal values at times that are proportional to fraction of the symbol duration. The symbol duration (T) is estimated from the Baud rate using:

$$T = \text{Baud\_Rate}^{-1} \tag{1}$$

Processor 102 further pre-distorts the signal to accommodate for the laser's linear and nonlinear impairments. The computation of parameters utilized for the pre-distortion is explained further in the specification.

The signal generated by the processor 102 is fed into a digital to analog converter (DAC) 104 circuit to convert the digital bits to an analog signal. Next, the analog signal is transmitted to a laser driver, amplifier, and filters 106 used to clean the analog electrical signal. Thereafter, a VCSEL 108 is used to convert the analog electrical signal to an optical signal which is coupled to a multimode optical fiber (MMF) 110 using a lens or diffractive optics device. During propagation through the fiber, the optical signal is effected by modal and chromatic dispersion as well as attenuation. Upon arrival at the opposite end of the fiber, the optical signal is detected by a photo-detector 112 which converts the optical signal to an electrical signal which is then amplified by way of a trans-impedance amplifier. Next, an analog front end 114 consisting of a continuous time linear equalizer (CTLE) and gain control amplifiers are used to correct and amplify the electrical signal to a required voltage to reduce or minimize quantization noise. Lastly, an analog digital converter (ADC) 116 converts the analog electrical signal to a digital electrical signal and processor 118 uses the digital signal to recover the original input information 100.

The corrective methods, described herein, used to improve the quality of signal transmission may be performed using processor 102 (located in the transmitter), processor 118 (located in the receiver), and/or by using an external processor dedicated to optimizing the pre-distortion of the laser or post-equalizing the received signal. It's worth noting that in practice, many of today's optical communication devices include both transmitter and receiver packaged together in a single device (transceiver). As such, processors 102 and 118 are likely to be located in the same transceiver and will likely correspond to the same circuit. Thus, the separation between processors 102 and 118 is provided primarily to emphasize the different functions perform during the optimization of the equalizer or during the operation of the transceiver.

To obtain preferred results, the corrective technique described herein correct for at least one of linear and non-linear impairments. For the linear components, one may use the minimum mean square equalizer with symbol spaced or fractional spaced taps. The equalization is typically applied at the receiver or transmitter to correct for inter-symbol interference (ISI). However, due to the non-linear and time variant response of multimode lasers, this linear approach is not efficient. This deficiency can be dealt with by distributing the linear equalization load among the transmitter and receiver. Such distribution is achieved by gradually varying the coefficients of the linear equalizer according to the signal eye diagram or BER estimated at the receiver. At each step, the linear equalizer is updated according to a set of rules and equations described herein. The linear equalizer implemented here, using the disclosed method, may produce a significant improvement in the signal eye diagram and BER. However, linear equalization alone has limitations for correcting other impairments caused by the non-linear response of the VCSEL, such as uneven signal level separation or eye diagram tilt.

An example of eye diagram tilt is shown in FIG. 2A which illustrates an eye diagram obtained at the receiver without any skew compensation. As evident from this illustration, top middle, and bottom eyes 201, 203, 205, respectively, exhibit a skew (shift relative to a vertical axis) relative to one another. To help correct such impairment, a non-linear equalizer is added as part of the corrective approach. It is computed using pre-determined functions that alter the shape of the pulse and distort the temporal sampling, producing the aligned eye diagram shown in FIG. 2B where top, middle, and bottom eyes 207, 209, 211 are substantially aligned.

FIG. 3 illustrates a flowchart representative of an algorithm which embodies the method of signal correction (also referred to as "training") in accordance with embodiments of the present invention. Each cycle or iteration of the algorithm is tracked by an index represented by the variable i.

Embodiment 1

In step 301, a non-distorted multi-level signal X that is based on a pseudo-random sequence is generated. Next, in step 303 a pre-distorted signal, $X^i_P$, is computed using:

$$X^i_P = c^i_L \otimes X \otimes c^i_{NL}(X) \quad (2)$$

where $c^i_L$, $C^i_{NL}$ are vectors that represent the linear and non-linear equalizers, respectively, and the second convolution corrects for the non-linearities produced by the laser, such as uneven signal level separation or eye diagram skew. At the beginning of the optimization process (i.e., i=0) the central taps of the linear and non-linear equalizers are set to one, and all other taps are set to zero.

Once the pre-distorted signal is generated in step 305, this signal $X^i_P$ is sent through the channel. In an embodiment, a channel can include all the components that are between the processors 102 and 118 (see FIG. 1). For example, this channel includes the DAC 104, laser driver 106, VCSEL 108, fiber 110, photo detector 112, analog front end 114, and ADC 116. The digitized signal arriving at processor 118 is labeled $Y^i$. During training, both X and $Y^i$ are known at the receiver.

After traversing the channel, the signal is evaluated and in step 307 linear equalizer taps are computed. In an embodiment, minimum mean square error (MMSE) is used to compute linear equalizer taps by:

$$b^i_L = (R_{xx}^{-1} + H^h R_{nn}^{-1} H)^{-1} H^h R_{nn}^{-1} \quad (3)$$

where, $R_{xx} = E\{XX^h\}$, $E\{\ \}$ represent the ensemble mean value operator, $R_{nn}$ is the correlation matrix of the noise, and H is a matrix that represent the channel response. The computed taps are then used for the correction of the linear response which is given by:

$$Z^i = b^i_L \otimes Y^i \quad (4)$$

Also, in step 307, the non-linear equalizer is computed. In an embodiment, the computation of the non-linear equalizer is performed only once at the beginning of the cycle, when i=0. In another embodiment, the non-linear equalizer is computed upon every iteration of the algorithm. In yet another embodiment, the non-linear equalizer is computed more than once, but not necessarily during every cycle of the algorithm (e.g., every other cycle, every third cycle, every fourth cycle, or in any desired sequence).

An example of the non-linear equalizer computation is provided with reference to a PAM-4 signal transmitted at a rate of 56 Gbps and represented in FIGS. 4A-4C. FIG. 4A illustrates an initial eye diagram obtained from the PAM-4 signal $Y^1$ transmitted over a channel. In this figure, the top, middle, and bottom eyes are indicated by reference numerals 501, 503, and 505, respectively. The eye diagram is stored in a matrix and normalized to the peak value. Next, it is inverted by subtracting 1 from all its elements. The inverted matrix, along with the inverted top, middle, and bottom eyes which are referenced as 507, 509, and 511, respectively, is shown in FIG. 4B. Using the inverted matrix, the amplitude profiles of these inverted eyes are computed. The profiles for the top, middle, and bottom eyes are represented by the 513, 515, and 517 traces in FIG. 4C. Once the profiles are available, the width of each profile is computed using:

$$Width_j = \sqrt{\frac{\sum_{v_y} profile_j(v_j)v_y^2}{\sum_{v_y} profile_j(v_y)}}. \quad (5)$$

where j is an index variable for the top, middle, or bottom eye. The levels of the PAM-M signal are corrected using functions that depend on the width variations. For example, using PAM-4, one can use:

Levels=[0,0.333,0.666,1]−Δ([0,Width$_1$,Width$_2$,
 Width$_3$]−min(Width$_1$,Width$_2$,Width$_3$))   (6)

Additionally, in step 307, the parameters to correct for the eye diagram skew are also computed using:

$$b^i_{NL}(Y^i) = f(g(Y_i)) \quad (6)$$

where f(.) is a function array that estimates the signal pulse shape and g(.) represents a function array that estimates the eye diagram skew. Typical functions for f(.) contemplated in this disclosure are the sinc function, raised cosine function, and Gaussian pulse shape and error function (erf) pulse. For example, when using the raised cosine function, f(.) is given by:

$$f(a) = \begin{cases} \frac{\pi}{4}\sin c\left(\frac{1}{2\beta}\right) & a = \pm\frac{1}{2\beta} \\ \sin c(a)\frac{\cos(\pi\beta a)}{1-(2\beta a)^2} & \text{otherwise} \end{cases} \quad (7)$$

where a is the function argument and β is the roll-off factor that represents the excess bandwidth of the filter from 0 to 1. Exemplary results of using three typical f(a) functions to estimate a signal pulse shape are shown in the plots of FIG. 5A.

As for functions g(.), these functions can be obtained from the inverted eyes 507, 509, and 511, shown in FIG. 4B. FIGS. 5B-5D show the application of different functions to the eye diagram of FIG. 4B to estimate the eye tilt/skew. For example, in FIG. 5B, the centroids of the top, middle, and bottom inverted eyes are computed and a linear polynomial fitting function is obtained. Therefore, g(.) can be defined by:

$$g(a) = \sum_{k=0} h_k a^k \quad (8)$$

Continuing with the example of FIG. 5B, which shows a linear estimator for the eye diagram skew as $$g(a) = h_1 a + h_0 \quad (9)$$

using h$_0$=0 to avoid corrections in the middle eye and assuming a non-linear equalizer with 2 taps, the equalization coefficients are given by:

$$b^i_{NL}(Y^i) = [f(1-h_1Y^i/T), f(Y^i/T)] \quad (10)$$

FIGS. 5C and 5D apply a similar approach but instead of obtaining a linear polynomial fitting function, the function of FIG. 5C is a quadratic polynomial fitting function and the function of FIG. 5D is a truncated cubic polynomial fitting function.

Referring back to FIG. 3, upon completion of post-equalization, in step 308 the performance of the system is estimated. In an embodiment, this is done by computing the BER which can be based on the eye diagram or by bit-to-bit comparison of signals X and Z$^i$. If the computed BER is within a preset threshold or if the computed BER is worse than the BER of a previous iteration (considered for second or higher cycles of the algorithm), the algorithm cycle is terminated and the system is then considered ready for communication. If, on the other hand, the computed BER is lower than the BER obtained in previous iterations, the filter taps are updated in step 310. For the linear component, the vectors update can be obtained using:

$$c^i_L = A(c^{i-1}_L \otimes b^{i-1}_L) + (1-A)(c^{i-1}_L) \quad (11)$$

where A is a weight factor which takes on values between 0 and 1, and regulates the update speed of the equalizer, and b$^i_L$ is a vector that represent the linear equalizer computed earlier. Likewise, for the non-linear component, the vectors update can be obtained by:

$$c^i_{NL}(X) = f(g(X)) \quad (12)$$

Once the equalizer taps and functions are updated, a new pre-distorted signal is generated in step 303 and the cycle continues until the BER floors are reached or until a target BER is achieved. In some embodiments, the optimization requires less than 10 iterations.

Embodiment 2

In an alternate embodiment of the present invention, the disclosed method is modified as follows. For the sake of convenience, reference is again made to the steps of FIG. 3. However, the content of those steps has been modified at least partially relative to the previously discussed embodiment.

In step 301, a non-distorted multi-level signal X that is based on a pseudo-random sequence is generated. Next, in step 303 a pre-distorted signal, X$^i_P$, is computed using:

$$X^i_P = c^i_L \otimes X \quad (13)$$

where c$^i_L$ is a vector that represents the linear equalizer. At the beginning of the optimization process (i.e., i=0) the central tap of the linear equalizer is set to one, and all other taps are set to zero. Once the pre-distorted signal is generated in step 305, this signal X$^i_P$ is sent through the channel, arriving at processor 118 as signal Y$^i$. During training, both X and Y$^i$ are known at the receiver.

After traversing the channel, the signal is evaluated and in step 307 the linear and non-linear equalizers are computed resulting in b$^i_L$ and b$^i_{NL}$(Y$^i$) vectors. In an embodiment, the linear and non-linear equalizers are computed pursuant to the same calculations as detailed in Embodiment 1. Likewise, as in Embodiment 1, the computation of the non-linear equalizer may be performed only once at the beginning of the cycle (i.e., when i=0), upon every iteration of the algorithm, or more than once, but not necessarily during every cycle of the algorithm (e.g., every other cycle, every third cycle, every fourth cycle, or in any desired sequence).

The computed taps are then used for the correction of the linear response which is given by:

$$Z^i = b^i_L \otimes Y^i \otimes b^i_{NL}(Y^i) \quad (14)$$

Referring back to FIG. 3, upon completion of post-equalization, in step 308 the performance of the system is estimated. In an embodiment, this is done by computing the BER which can be based on the eye diagram or by bit-to-bit comparison of signals X and Z$^i$. If the computed BER is within a preset threshold or if the computed BER is worse than the BER of a previous iteration (considered for second or higher cycles of the algorithm), the algorithm cycle is terminated and the system is then considered ready for communication. If, on the other hand, the computed BER is lower than the BER obtained in previous iterations, the linear filter taps are updated in step 310 using equation (11). Once the equalizer taps are updated, a new pre-distorted signal is generated in step 303 and the cycle continues until the BER floors are reached or until a target BER is achieved. In some embodiments, the optimization requires less than 10 iterations.

Embodiment 3

In yet another embodiment of the present invention, the disclosed method is modified as follows. As previously, for the sake of convenience, reference is again made to the steps of FIG. 3. However, the content of those steps has been modified at least partially relative to the previously discussed embodiments.

In step 301, a non-distorted multi-level signal X that is based on a pseudo-random sequence is generated. Next, in step 303 a pre-distorted signal, $X^i_P$, is computed using equation (2). At the beginning of the optimization process (i.e., i=0) the central taps of the linear and non-linear equalizers are set to one, and all other taps are set to zero. Once the pre-distorted signal is generated in step 305, this signal $X^i_P$ is sent through the channel, arriving at processor 118 as signal $Y^i$. During training, both X and $Y^i$ are known at the receiver.

After traversing the channel, the signal is evaluated and in step 307 the linear and non-linear equalizers are computed resulting in $b^i_L$ and $b^i_{NL}(Y^i)$ vectors. In an embodiment, the linear and non-linear equalizers are computed pursuant to the same calculations as detailed in Embodiment 1. Likewise, as in Embodiment 1, the computation of the non-linear equalizer may be performed only once at the beginning of the cycle (i.e., when i=0), upon every iteration of the algorithm, or more than once, but not necessarily during every cycle of the algorithm (e.g., every other cycle, every third cycle, every fourth cycle, or in any desired sequence). The computed taps are then used for the correction of the linear response pursuant to equation (14) resulting in signal $Z^i$.

Referring back to FIG. 3, upon completion of post-equalization, in step 308 the performance of the system is estimated. In an embodiment, this is done by computing the BER which can be based on the eye diagram or by bit-to-bit comparison of signals X and $Z^i$. If the computed BER is within a preset threshold or if the computed BER is worse than the BER of a previous iteration (considered for second or higher cycles of the algorithm), the algorithm cycle is terminated and the system is then considered ready for communication. If, on the other hand, the computed BER is lower than the BER obtained in previous iterations, the linear filter taps are updated in step 310 using equations (11) and (12). Once the equalizer taps and functions are updated, a new pre-distorted signal is generated in step 303 and the cycle continues until the BER floors are reached or until a target BER is achieved. In some embodiments, the optimization requires less than 10 iterations.

Figure 6:
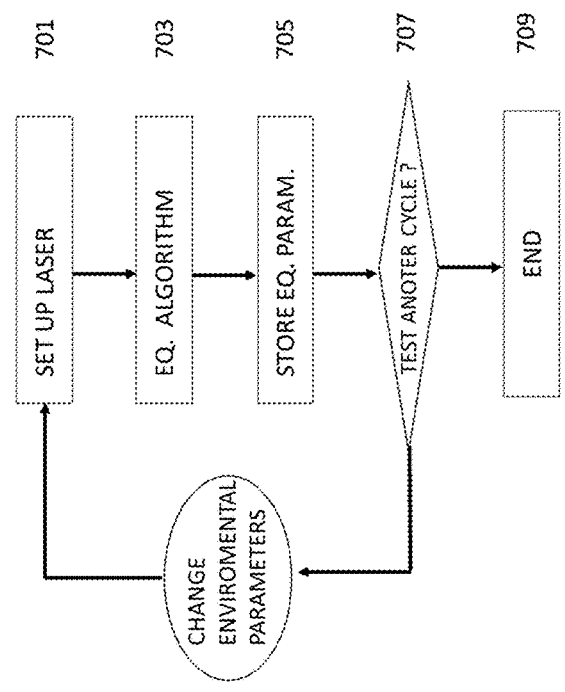
FIG. 6 illustrates a flow diagram of a method of optimizing an optical transmission system, according to an embodiment of the present invention.

Since the operation of a laser optical source may be affected, to some degree, by temperature or bias current variations, it may be advantageous to estimate and store the optimum equalizer parameters for a range of operational conditions (e.g. range of temperatures in data centers). FIG. 6 shows flowchart representative of a method based on the equalizer optimization algorithm disclosed earlier to evaluate and store the preferred or optimum equalization parameters for a required range of operational conditions.

In this method, the optimum equalization parameters for several environmental conditions (e.g., temperature and or bias current) are measured for a set of lasers representative of a fabricated batch. A short link of multimode fiber (e.g. 1 m) can be used in order to isolate the pre-distortion equalizer optimization to the channel response due to the fiber and receiver. The advantage of using a short fiber link is that the pre-distortion can primarily be dedicated to correcting the laser response of the representative laser while neglecting the modal-chromatic dispersion of the fiber and other laser impairments due to the normal laser fabrication process which can be corrected by the post-equalizer at the receiver. Using this method, the laser correction, especially the non-linear correction component, can be performed during operation and changed rapidly according to environmental conditions, while the post-equalizer can adapt to different length of fibers or batch variations.

Referring to FIG. 6, the procedure begins in step 701 where the laser or transceiver is turned on with a specified bias voltage in a temperature controlled environment. In step 703 the algorithm represented in FIG. 3 is performed in order to find the optimum linear and non-linear equalizer. Next, in step 705 the optimum equalization parameters are stored. Thereafter, the operational conditions, (e.g., temperature and/or bias current) are changed within a pre-determined range and the cycle is repeated until all desired operational conditions in the specified range are tested. Once the test finalizes, the stored optimum equalization parameters are transferred to memory in the transceiver processor (102 and 108) for use during operation.

Figure 7:
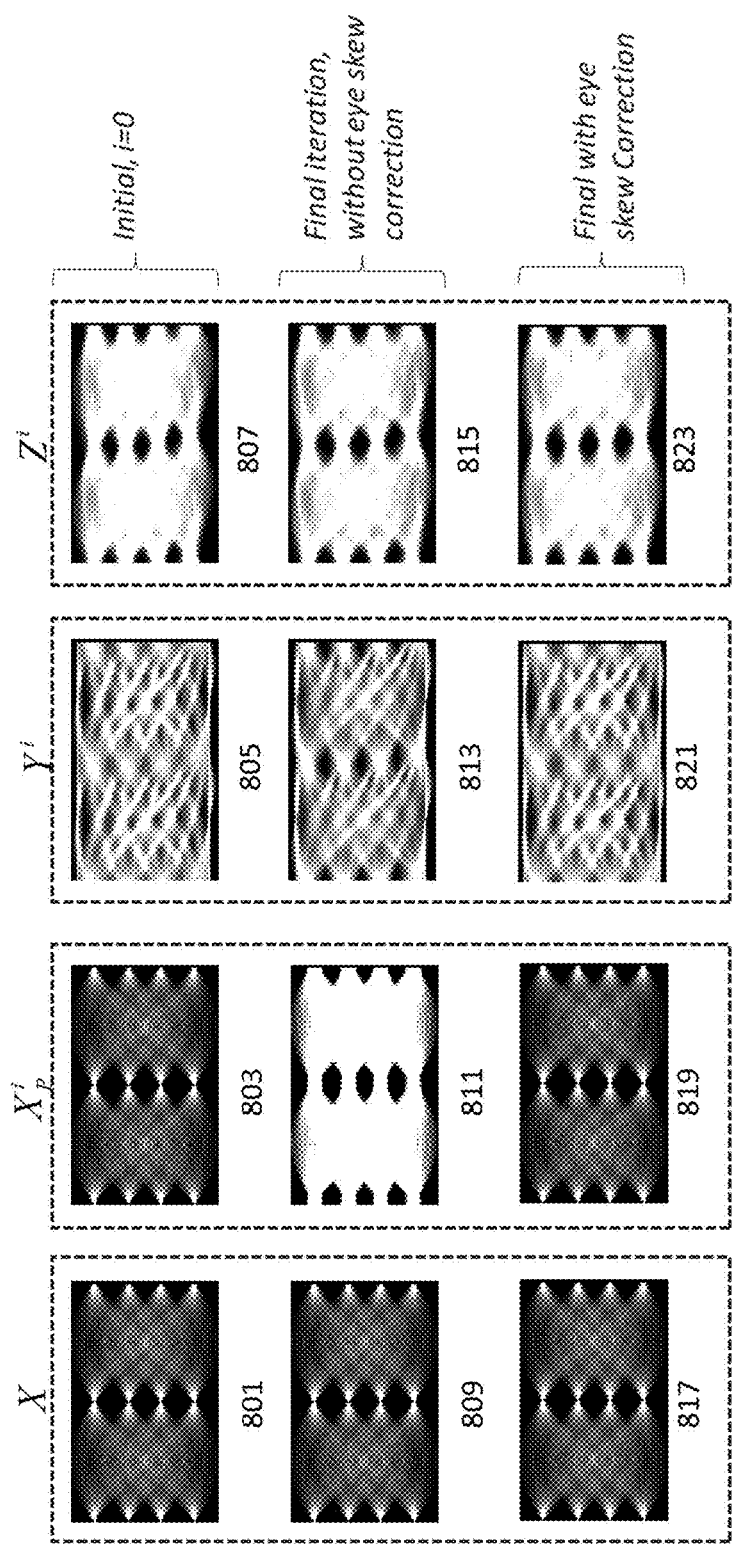
FIG. 7 illustrates an exemplary implementation of system tuning, in accordance with an embodiment of the present invention, for a VCSEL operating at 56 Gb/s with high bias voltage.
Figure 8:
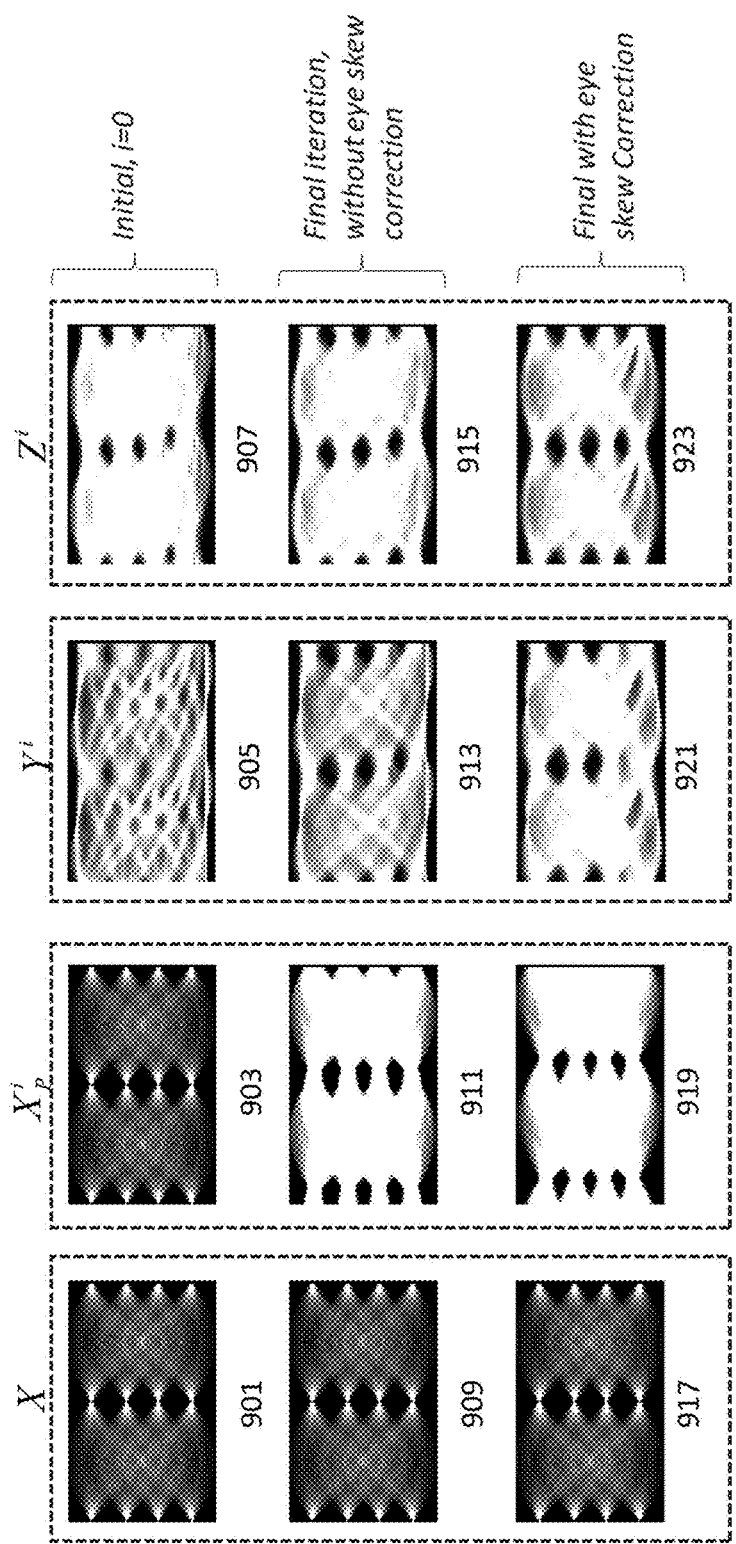
FIG. 8 illustrates an exemplary implementation of system tuning, in accordance with an embodiment of the present invention, for a VCSEL operating at 56 Gb/s with low bias voltage.
Figure 9:
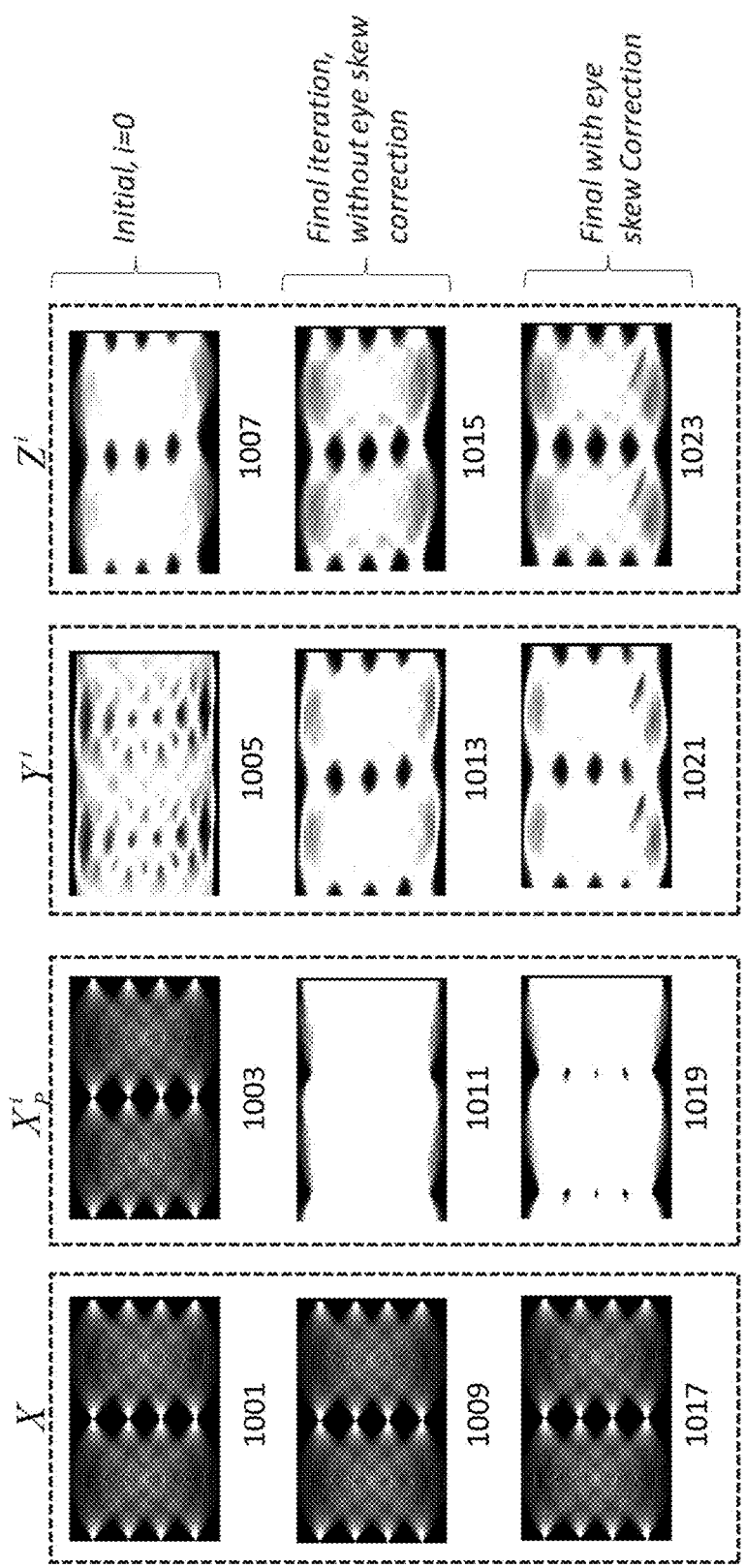
FIG. 9 illustrates an exemplary implementation of system tuning, in accordance with an embodiment of the present invention, for a VCSEL operating at 64 Gb/s with high bias voltage.
Figure 10:
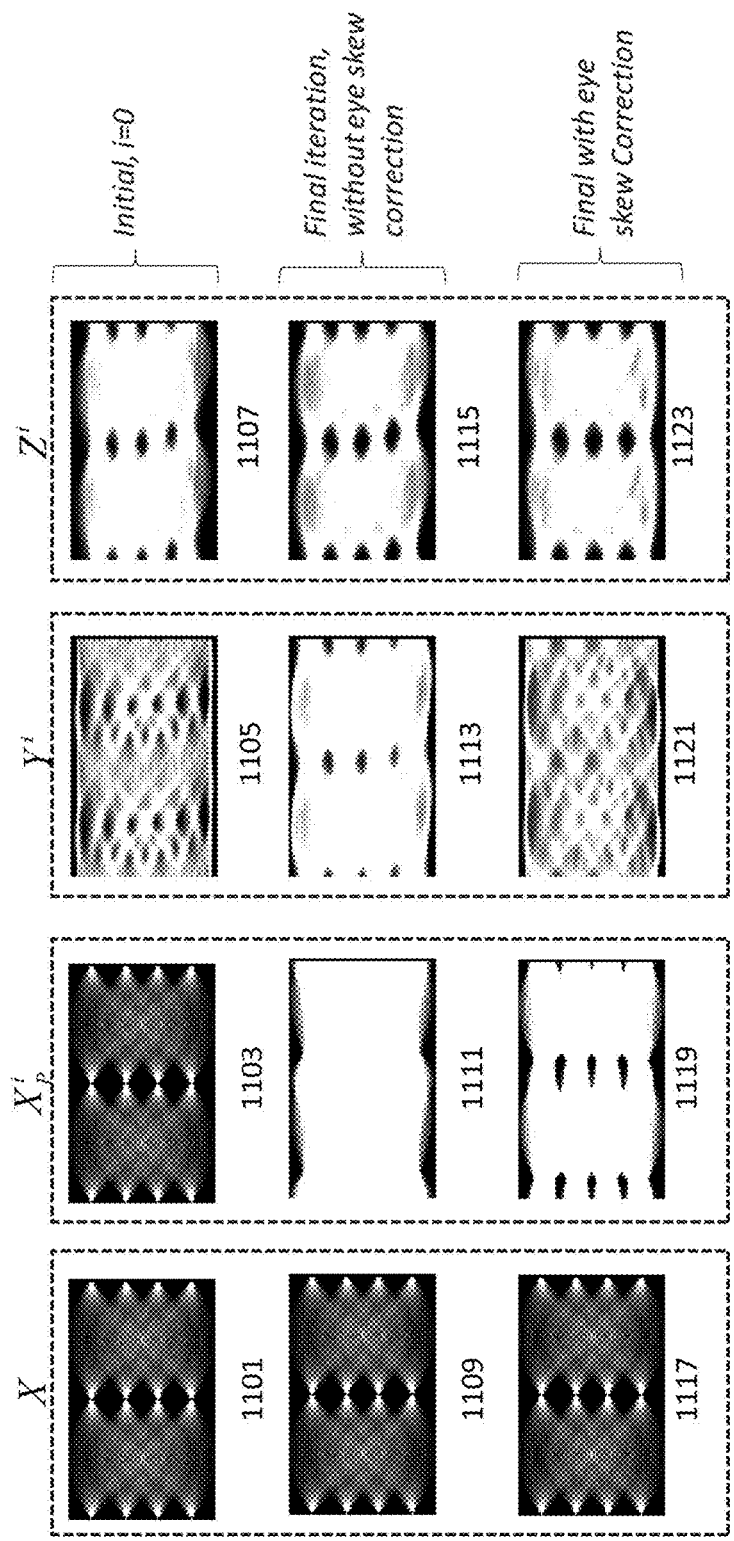
FIG. 10 illustrates an exemplary implementation of system tuning, in accordance with an embodiment of the present invention, for a VCSEL operating at 70 Gb/s with high bias voltage.

Implementation of the method described herein has been achieved using an arbitrary waveform generator (AWG) and real time scope (RTS) capable of 100 GSa/s. A program running on an external computer controlled the AWG and RTS as well as the voltage sources, laser, and photodetector. Several VCSELs with operating wavelengths of 850 nm and 980 nm and PAM-4 modulation format were used to transmit at data rates over 50 Gbps and BER<1e-4, which are low enough to produce a post forward error correction (FEC) BER<1e-15 when RS(544,514) or better FEC is utilized. FIGS. 7-10 serve to illustrate several stages of the algorithm implementation. FIGS. 7 and 8 show PAM-4 transmission eyes for 56 Gb/s using two bias voltages, 2.5 V and 2.3 V. FIGS. 9 and 10 show PAM-4 transmission using a 2.5 V bias voltage at two data rates: 64 Gbps and 70 Gbps.

For exemplary purposes the number of taps on the experiments was fixed to 13 and fractional spaced sampling was used. In addition, all examples use the same physical optical link which included 100 m of high bandwidth modal-chromatic dispersion compensating OM4 fiber.

FIGS. 7-10 each show 4 vertical columns, where the eye diagrams of signals $\{X, X^i_P, Y^i, Z^i\}$ are compared. The signal transmitted without pre-distortion, X, is shown in the first column, the signal transmitted with pre-distortion, $X^i_P$, is shown in the second column, the received signal without post-equalization, $Y^i$, is the third column, and the post-equalized signal, $Z^i$ is the fourth column. The rows represent the resultant eye diagrams according to the processing process represented in FIG. 3 at several stages. The first row, i=0, shows the eye diagrams during the first iteration. The second row is the last iteration when the non-linear component of the equalizer is turned off. The third row shows the eye diagrams for the final iteration when the non-linear correction is implemented.

The improvements at each stage due only to linear post equalization, pre-distortion, or both can be observed in each figure. For example, image (805) in FIG. 7 shows the eye diagram without pre-distortion and without post-equalization for 56 Gbps using a 2.5 bias voltage. The BER for this eye diagram is greater than 2e-2. Image (807) shows the eye diagram when only linear post-equalization is applied. This image indicates that the eye diagram can be improved producing a BER of ≈4.5e-5. Image (815) shows the final iteration of the proposed algorithm when the eye skew correction is turned off. In that case, since the equalization is shared by the transmitter and receiver the BER reduces to ≈2.1e-5. Image (823) shows the final results when the eye diagram skew correction as disclosed in the present invention is turned on. In this case the BER reduces to ≈7.8e-6.

FIG. 8 uses the same laser operating with a lower bias voltage (2.3V), which effectively reduces the bandwidth and increases the eye diagram tilt. Image (905), shows the eye diagram without pre-distortion and without post-equalization for 56 Gb/s, which produces a BER of ≈7.9e-2. Image (907) shows the eye diagram when only linear post-equalization is applied, which produces a BER of ≈3.2e-3. Image (915) shows the final iteration of the proposed algorithm when the eye skew correction is turned off. In that case, since the equalization is shared by the transmitter and receiver, the BER reduces to ≈4.1e-4. Image (923) shows the final results when the eye diagram skew correction disclosed in the present invention, is turned on. In this case the BER reduces to ≈8.6e-5.

Image (1005) in FIG. 9, shows the eye diagram without pre-distortion and without post-equalization for 64 Gbps using 2.5 bias voltage. This eye diagram produces BER of ≈3e-2. Image (1007) shows the eye diagram when only linear post-equalization is applied, which produces a BER of ≈4.5e-4. Image (1015) shows the final iteration of the proposed algorithm when the eye skew correction is turned off, which produces a BER of ≈3.5e-5. Image (1023) shows the results when the eye diagram skew correction disclosed in the present invention is turned on, which produces a BER reduces to ≈1.3e-5.

Lastly, image (1105) in FIG. 10 shows the eye diagram without pre-distortion and without post-equalization for 70 Gbps using 2.5 bias voltage. This eye diagram produces a BER of Image (1107) shows the eye diagram when only linear post-equalization is applied, which reduces the BER to ≈9e-4. Image (1115) shows the final iteration of the proposed algorithm when the eye skew correction is turned off producing a BER of ≈6.6e-5. By turning on the eye diagram skew correction the BER reduces to ≈3.2e-5.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

We claim:

1. A method of tuning a fiber optic communication system comprising the steps of:
   (a) generating a source signal X;
   (b) pre-distorting said source signal X by applying at least one pre-distortion equalizer to said source signal X to generate a pre-distorted signal $X^i_P$;
   (c) transmitting said pre-distorted signal $X^i_P$ over an optical channel to generate a transmitted signal $Y^i$;
   (d) post-equalizing said transmitted signal $Y^i$ by applying at least one post-equalization equalizer to said transmitted signal $Y^i$ to generate a post-equalized signal $Z^i$;
   (e) evaluating said post-equalized signal $Z^i$ to determine a performance of said fiber optic communication system; and
   (f) when said performance of said fiber optic communication system fails to meet a predefined threshold, updating said at least one pre-distortion equalizer and repeating steps (b)-(f),
   wherein i represents an index tracking each cycle of performing said steps (b)-(f).

2. The method of claim 1, wherein said step (b) includes convolving said source signal X with a linear pre-distortion equalizer $c^i_L$ such that $X^i_P = c^i_L \otimes X$.

3. The method of claim 2, further comprising the steps of:
   computing a linear post-equalization equalizer $b^i_L$; and
   in said step (d), convolving said linear post-equalization equalizer $b^i_L$ with said transmitted signal $Y^i$ such that $Z^i = b^i_L \otimes Y^i$.

4. The method of claim 3, wherein said linear post-equalization equalizer $b^i_L$ is computed by minimum mean square error.

5. The method of claim 3, wherein after said step (c) said method further comprises a step of computing a non-linear post-equalization equalizer $b^i_{NL}(Y^i)$.

6. The method of claim 5, wherein said step (d) further includes convolving said transmitted signal $Y^i$ with said non-linear post-equalization equalizer $b^i_{NL}(Y^i)$ such that $Z^i = b^i_L \otimes Y^i \otimes b^i_{NL}(Y^i)$.

7. The method of claim 5, wherein $b^i_{NL}(Y^i) = f(g(Y^i))$, where f(.) is a function array that estimates a shape of said transmitted signal $Y^i$, and where g(.) is a function array that estimates a skew of an eye diagram of said transmitted signal $Y^i$.

8. The method of claim 5, wherein step of computing said non-linear post-equalization equalizer $b^i_{NL}(Y^i)$ occurs one of (i) only during a first said cycle, (ii) during every other said cycle, or (iii) during more than one said cycle.

9. The method of claim 5, wherein said step of updating said at least one pre-distortion equalizer includes updating said linear pre-distortion equalizer $c^i_L$ such that $c^i_L = A(c^{i-1}_L \otimes b^{i-1}_L) + (1-A)(c^{i-1}_L)$, where A is a weight factor between 0 and 1.

10. The method of claim 5, wherein said step (b) further includes convolving said source signal X with a non-linear pre-distortion equalizer $c^i_{NL}(X)$ such that $\chi^i_P = c^i_L \otimes X \otimes c^i_{NL}(X)$.

11. The method of claim 10, wherein said step (d) further includes convolving said transmitted signal $Y^i$ with said non-linear post-equalization equalizer $b^i_{NL}(Y^i)$ such that $Z^i = b^i_L \otimes Y^i \otimes b^i_{NL}(Y^i)$.

12. The method of claim 10, wherein step of computing said non-linear post-equalization equalizer $b^i_{NL}(Y^i)$ occurs one of (i) only during a first said cycle, (ii) during every other said cycle, or (iii) during more than one said cycle.

13. The method of claim 10, wherein $b^i_{NL}(Y^i) = f(g(Y^i))$, where f(.) is a function array that estimates a shape of said transmitted signal $Y^i$, and where g(.) is a function array that estimates a skew of an eye diagram of said transmitted signal $Y^i$.

14. The method of claim 12, wherein said step of updating said at least one pre-distortion equalizer includes:

updating said linear pre-distortion equalizer $c^i_L$ such that $c^i_L = A(c^{i-1}_L \otimes b^{i-1}_L) + (1-A)(c^{i-1}_L)$, where A is a weight factor between 0 and 1; and updating said non-linear pre-distortion equalizer $c^i_{NL}(X)$ such that $c^i_{NL}(X) = f(g(X))$.

15. The method of claim 1, wherein during a first said cycle a center tap of said at least one pre-distortion equalizer is set to 1 and all non-center taps of said at least one pre-distortion equalizer are set to 0.

16. The method of claim 1, wherein said fiber optic communication system is configured to operate using pulse amplitude modulation (PAM).

17. The method of claim 16, wherein said PAM is PAM-4.

* * * * *